United States Patent [19]

Ikegaya et al.

[11] Patent Number: 5,379,124
[45] Date of Patent: Jan. 3, 1995

[54] FACSIMILE SYSTEM

[75] Inventors: Tadahiko Ikegaya; Yoshihiro Maei; Tsunehiro Matsui; Takashi Sakayama; Yasuhiro Kamiyama, all of Saitama, Japan

[73] Assignee: Fuji Xerox Co., Ltd., Tokyo, Japan

[21] Appl. No.: 888,026

[22] Filed: May 26, 1992

[30] Foreign Application Priority Data

May 27, 1991 [JP] Japan .................................. 3-149217

[51] Int. Cl.⁶ .............................................. H04N 1/00
[52] U.S. Cl. ...................................... 358/440; 358/404; 358/444
[58] Field of Search ............... 358/444, 404, 446, 437; 379/100

[56] References Cited

U.S. PATENT DOCUMENTS

| 4,524,393 | 6/1985 | Ohzeki | 358/448 |
| 4,717,967 | 1/1988 | Yashida | 358/448 |
| 4,789,903 | 12/1988 | Kamada et al. | 358/401 |
| 4,887,164 | 12/1989 | Takahashi | 358/443 |
| 4,920,427 | 4/1990 | Hirata | 379/100 |
| 4,975,783 | 12/1990 | Takaoka | 358/444 |
| 5,020,096 | 5/1991 | Sakakibara et al. | 358/444 |

FOREIGN PATENT DOCUMENTS

| 50128867 | 7/1984 | Japan | 358/440 |
| 60-132457 | 7/1985 | Japan | 379/100 |
| 0276939 | 12/1987 | Japan | 358/400 |
| 2-31563(A) | 2/1990 | Japan . | |
| 2134069 | 5/1990 | Japan . | |
| 2-171060(A) | 7/1990 | Japan . | |
| 02280457 | 11/1990 | Japan . | |
| 031636 | 1/1991 | Japan . | |

Primary Examiner—Edward L. Coles, Sr.
Assistant Examiner—Thomas L. Stoll
Attorney, Agent, or Firm—Finnegan, Henderson, Farabow, Garrett & Dunner

[57] ABSTRACT

A facsimile system includes an image memory for temporarily storing image data, where the system detects identification data of a counterpart station, the identification data being received together with image data from the counterpart station, stores the identification data of specific counterpart stations, searches the identification data detected from among the identification data stored in the identification data storage, detects a remaining memory capacity in the image memory, and judges whether storage of the image data in the image memory is permitted or prohibited based on a result of the searching and a result of the detection of the remaining memory capacity.

2 Claims, 7 Drawing Sheets

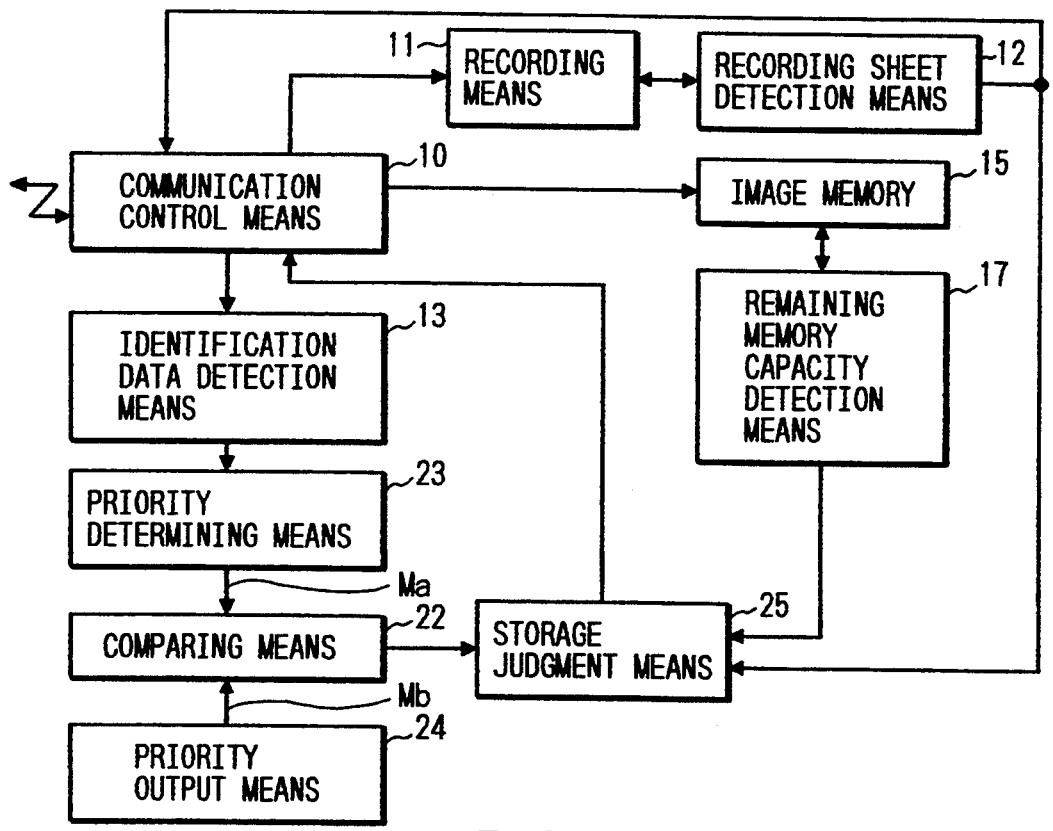
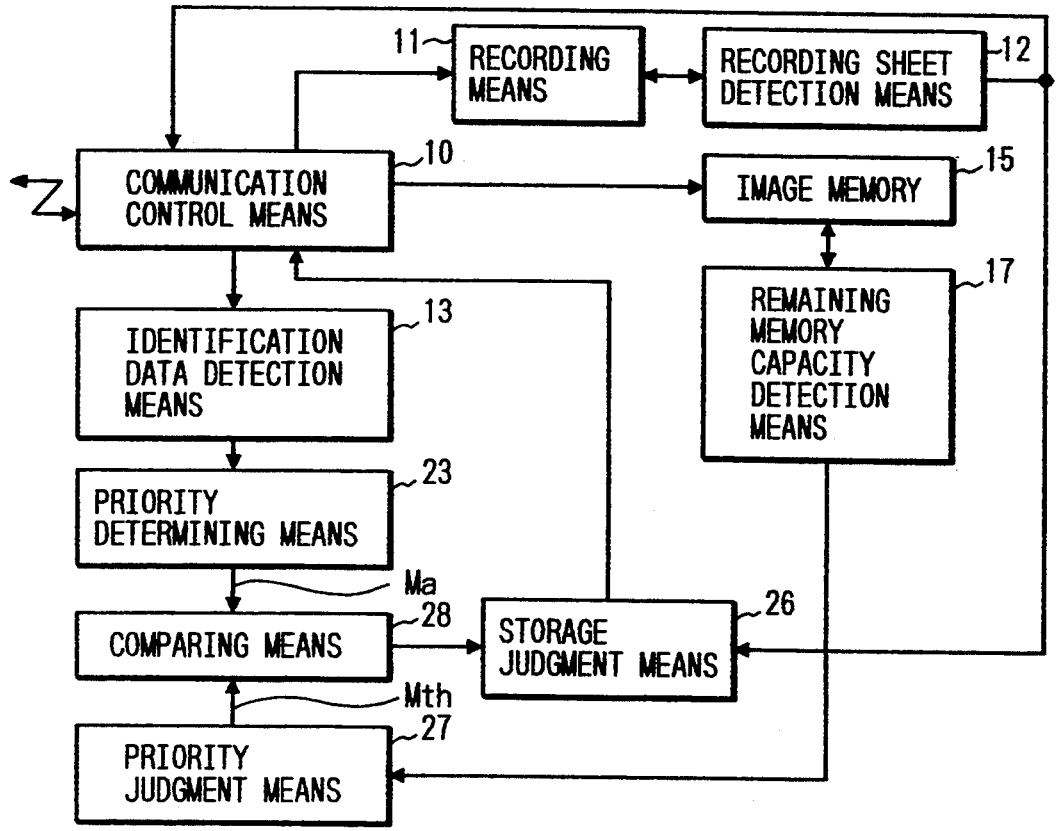

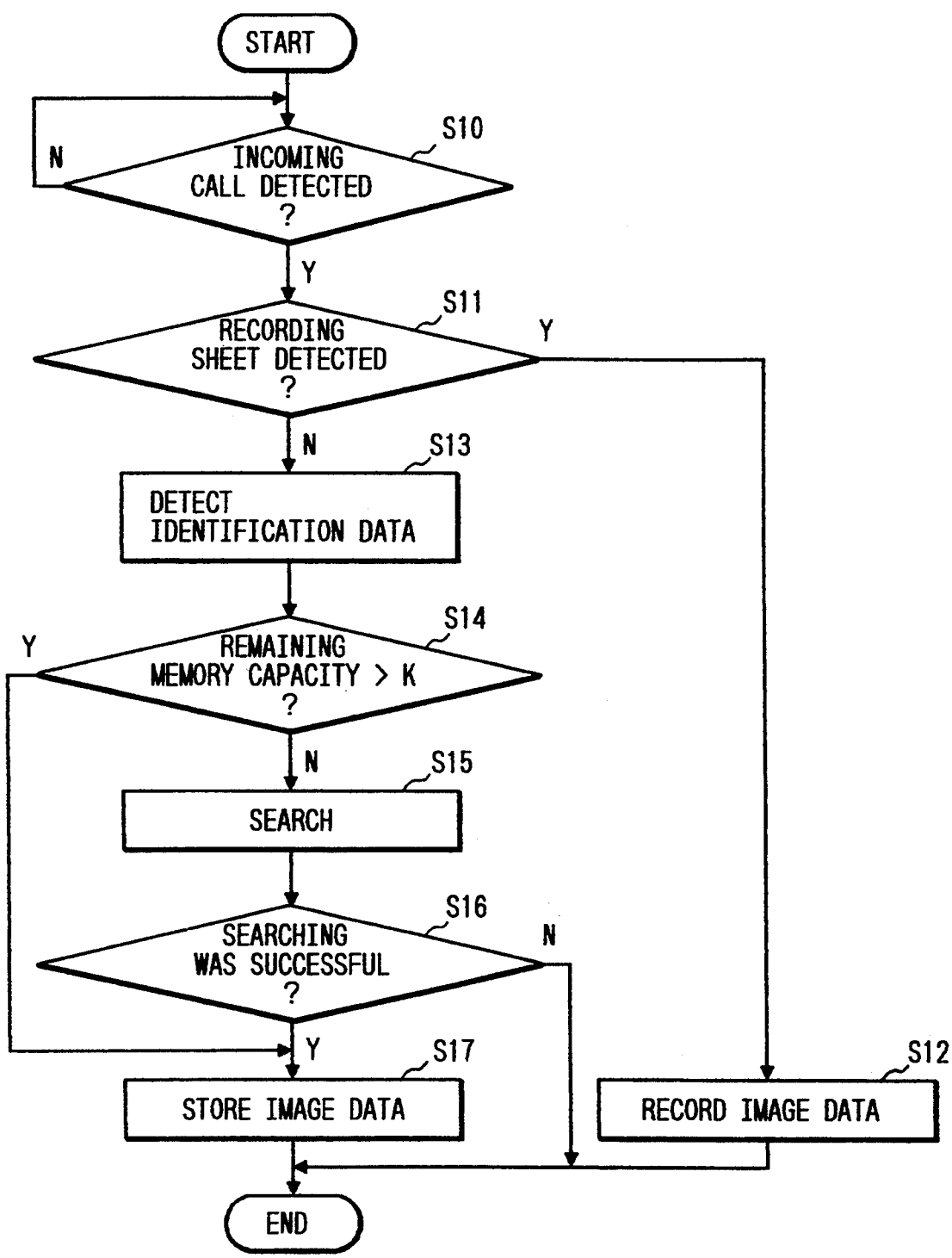

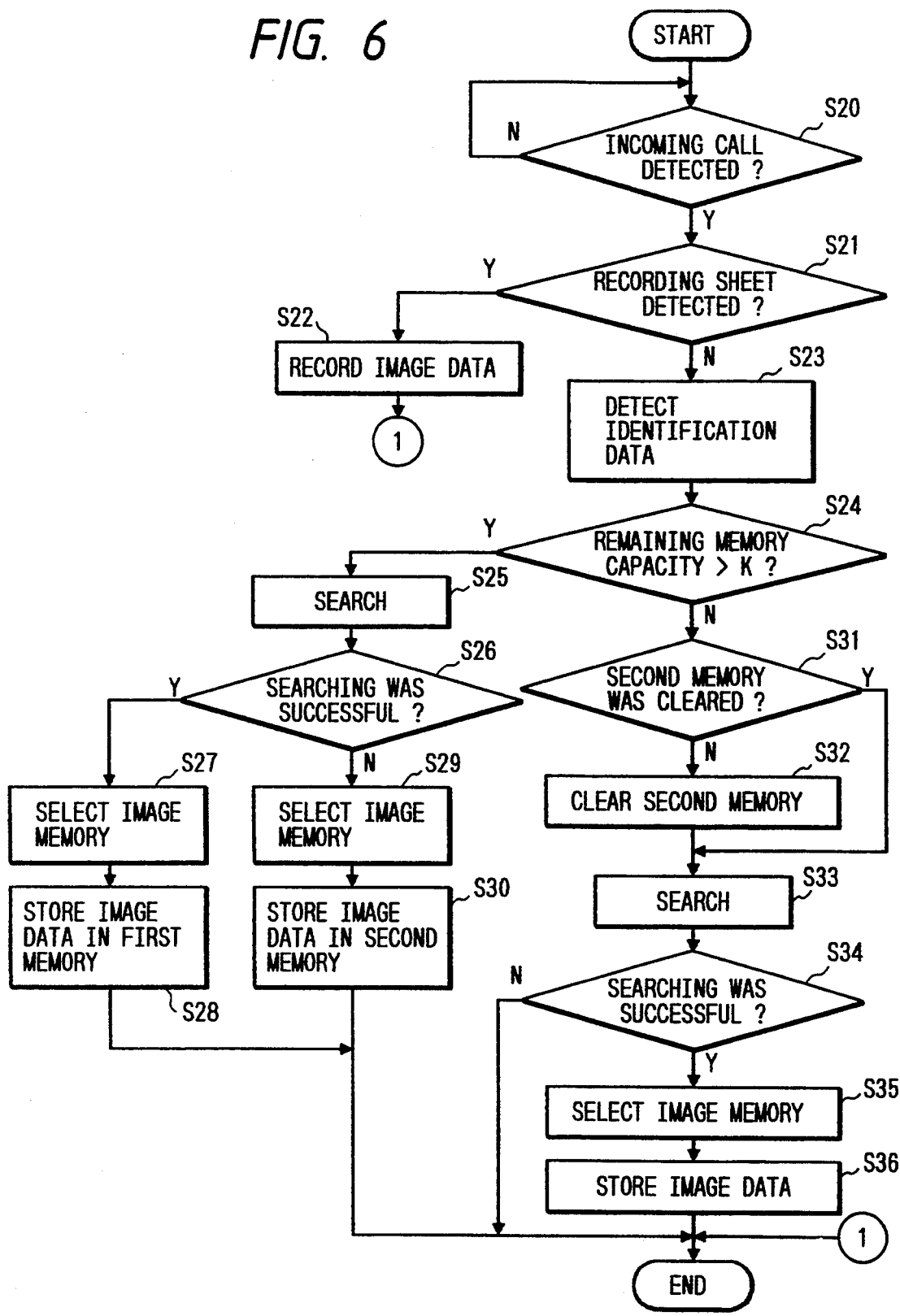

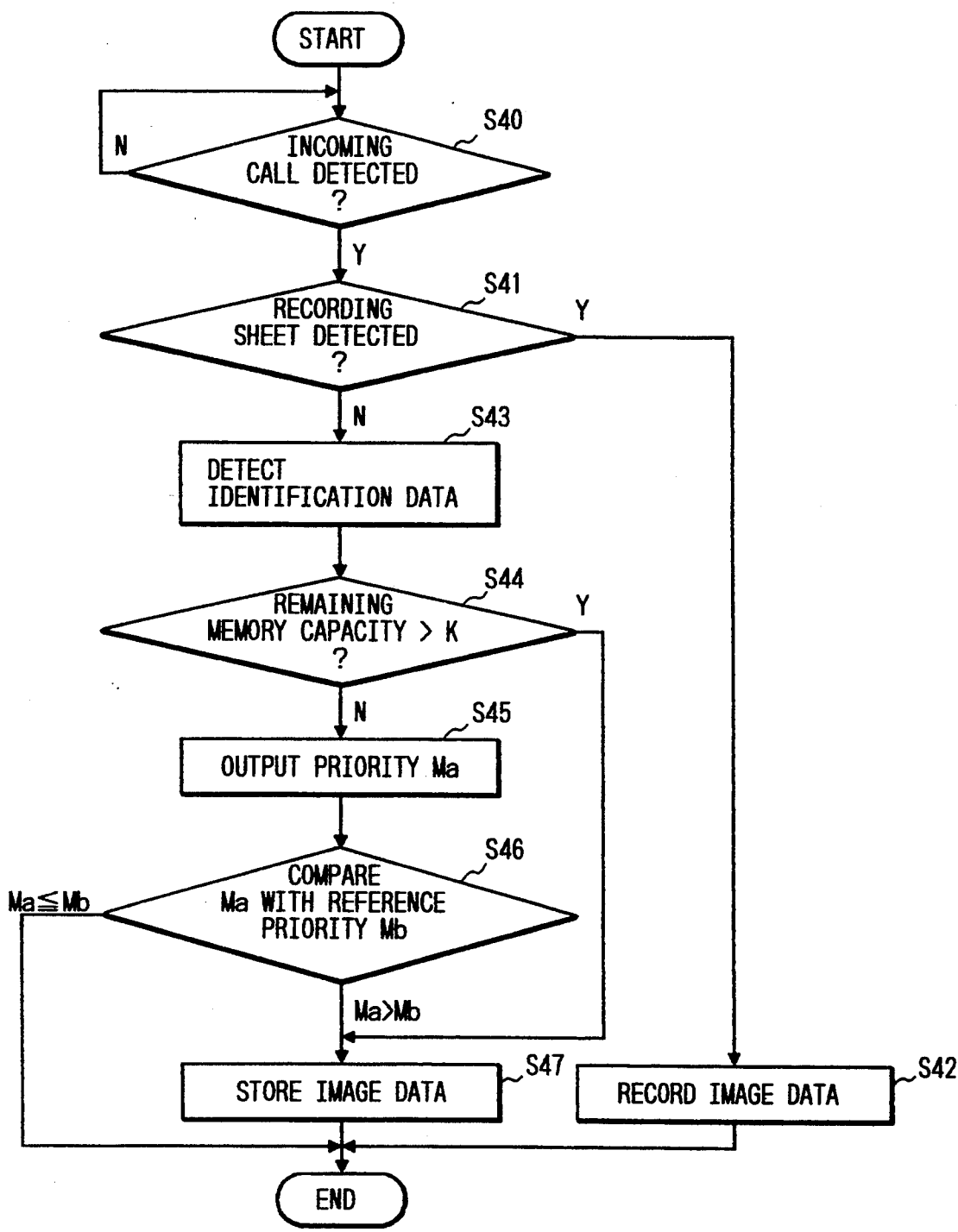

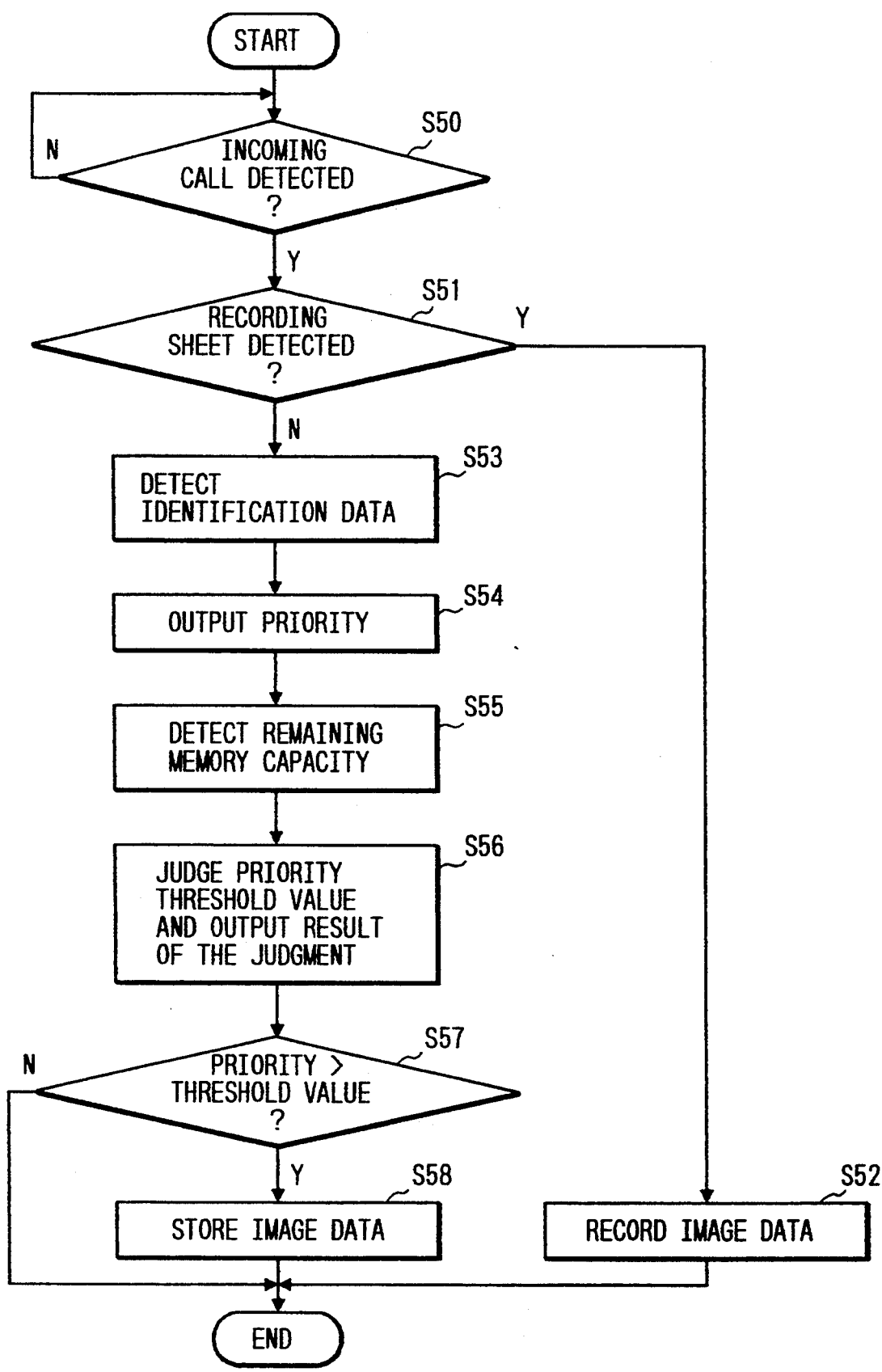

FIG. 9

| IDENTIFICATION DATA | PRIORITY Ma |
|---|---|
| 1 2 3 4 | 1 |
| 2 3 4 5 | 5 |
| 3 4 5 6 | 9 |
| ⋮ | ⋮ |
| 6 7 8 9 | 4 |

FIG. 10

| REMAINING MEMORY CAPACITY | PRIORITY THRESHOLD Mth |
|---|---|
| 1 0 0 % | 0 |
| 9 0 % | 1 |
| 8 0 % | 2 |
| ⋮ | ⋮ |
| 0 % | 1 0 |

FACSIMILE SYSTEM

BACKGROUND OF THE INVENTION

The invention relates to facsimile systems and, more particularly, to a facsimile system having the function of storing image data.

Along with the increasing popularity of facsimile systems among various users in recent years grow the needs for new facsimile systems with more sophisticated functions. To meet such needs, a facsimile system having an image memory for storing image data (hereinafter abbreviated as the "memory FAX") has been developed.

In the memory FAX received image data is not printed out immediately, but the image data is temporarily stored in an image memory and printed out at a desired timing afterwards. As to image data to be transmitted which is read with a scanner, the read image data is not transmitted immediately, but temporarily stored in the image memory and transmitted at a predetermined timing afterwards. Such a technique allows communication time to be reduced compared with conventional systems, which thus provides the user with the advantage curtailing communication fees.

Also, the memory FAX has a so-called "substituted receive" function, in which image data can be received storing the received image data in the image memory even after a recording sheet has run out. The substitute receive thus ensures reception of image data even if a recording sheet has been used up.

The thus designed memory FAX, however, addresses various problems arisen from memory capacity restrictions. To overcome the problems, the following proposals have heretofore been made.

(1) When image data for memory transmission has been stored in the image memory and then there is a reception immediately before transmitting that stored image data, the received data is outputted on a realtime basis if the recording sheet is ready, and the image data stored in the memory is transmitted upon end of the reception. However, if the recording sheet is insufficient or has run out during the reception, the memory, being occupied by the image data for transmission, cannot therefore ensure substitute reception.

To overcome the above problem, proposed in, e.g., Japanese Patent Unexamined Publication No. 31563/1990 is a technique, in which when data is received in the form of substitute reception with image data for memory transmission already stored, a memory area for the substitute reception is reserved by deleting the image data for memory transmission.

(2) As in item (1), once the storage capacity of the image memory becomes insufficient due to the storage of image data for memory transmission or the storage of a large volume of image data received as substitute receptions, substitute reception can no longer be executed.

To overcome the above problem, proposed in e.g., Japanese Patent Unexamined Publication No. 171060/1990 is a technique, in which image data is transferred to pre-registered destinations upon reception of the image data with the remaining storage capacity of the image memory scarce.

As facsimile communications become popular, direct mails or erroneous facsimile communications increase, which annoys the users with the reception of unnecessary data.

However, as represented by the above-mentioned conventional art, no prioritization in terms of importance or emergency has been made on the received data and thus all the received data are treated equally. Therefore, unnecessary image data or image data of low importance have been received in the form of substitute reception without any restriction, leaving necessary image data out from the image memory.

The invention has been made in view of the above circumstances. Accordingly, an object of the invention is to utilize an image memory efficiently by allowing only necessary image data to be stored selectively or preferentially.

SUMMARY OF THE INVENTION

To achieve the above object, the invention is characterized by providing the following means in a facsimile system having the function of storing image data in an image memory.

A first aspect of the invention is applied to a facsimile system that includes: a means for storing identification data of specific counterpart stations; a means for searching identification data of a counterpart station, from which image data has been received, from among the identification data stored in the identification data storage means; a means for detecting a remaining memory capacity in the image memory; and a means for judging whether the storage of the image data is permitted or prohibited based on a result of a searching by the searching means and a result of a detection by the remaining memory capacity detection means.

A second aspect of the invention is applied to a facsimile system that includes: a means for storing identification data of specific counterpart stations; a means for searching identification data of a counterpart station, from which image data has been received, from among identification data stored in the identification data storage means; a first image memory for storing image data transmitted from the specific counterpart stations; a second image memory for storing mainly image data transmitted from stations other than the specific counterpart stations; a means for detecting a remaining memory capacity in the first image memory; a means for judging whether the storage of the image data is permitted or prohibited based on a result of a searching by the searching means and a result of a detection by the remaining memory capacity detection means; and a means for selecting either the first image memory or the second image memory as a destination for storing the image data based on the result of the searching by the searching means and the result of the detection by the remaining memory capacity detection means.

A third aspect of the invention is applied to a facsimile system that includes: an image memory; a means for outputting a reference priority permitting the storage of image data; a means for determining a priority given to a counterpart station, from which image data has been received, based on identification data thereof; a means for comparing the priority outputted from the priority determining means with the reference priority outputted from the priority outputting means; a means for detecting a remaining memory capacity; and a means for judging whether the storage of the image data is permitted or prohibited based on a result of a comparison by the comparing means and a result of a detection by the remaining memory capacity detection means.

A fourth aspect of the invention is applied to a facsimile system that includes: a means for detecting a remaining memory capacity in an image memory; a priority judgment means for outputting a reference priority corresponding to a result of a detection by the remaining memory capacity detection means; a means for determining a priority given to a counterpart station, from which image data has been received, based on identification data thereof; a means for comparing the priority outputted from the priority determining means and the reference priority; and a means for judging whether the storage of the image data is permitted or prohibited based on a result of a comparison by the comparing means.

According to the first aspect of the invention, when the remaining memory capacity in the image memory becomes scarce, only the image data from a counterpart station whose identification data is stored in the identification storage means is stored in the image memory. Therefore, only the image data from a specific counterpart station can be stored selectively.

According to the second aspect of the invention, when the remaining memory capacity in the image memory becomes scarce, only the image data from a counterpart station whose identification data is stored in the identification storage means is stored in the image memory preferentially. Therefore, the image data from a specific counterpart station can be stored preferentially.

According to the third aspect of the invention, when the remaining memory capacity in the image memory becomes scarce, only the image data from a counterpart station having a higher priority than a reference priority is stored in the image memory. Therefore, only the image data from a counterpart station having a higher priority can be stored selectively.

According to the fourth aspect of the invention, only the image data from a counterpart station having a higher priority than a reference priority determined in accordance with the remaining memory capacity in the image memory is stored in the image memory. Therefore, the image data from a counterpart station having a higher priority can be stored preferentially.

BRIEF DESCRIPTION OF THE DRAWINGS

FIG. 3 is a functional block diagram of a third embodiment of the invention;

FIG. 4 is a functional block diagram of a fourth embodiment of the invention;

FIG. 5 is a flowchart illustrative of an operation of the embodiment shown in FIG. 1;

FIG. 6 is a flowchart illustrative of an operation of the embodiment shown in FIG. 2;

FIG. 7 is a flowchart illustrative of an operation of the embodiment shown in FIG. 3;

FIG. 8 is a flowchart illustrative of an operation of the embodiment shown in FIG. 4;

FIG. 9 is a diagram showing an exemplary data table of a priority determining means; and FIG. 10 is a diagram showing another exemplary data table of the priority judging means.

DETAILED DESCRIPTION OF THE PREFERRED EMBODIMENTS

Figure 1:
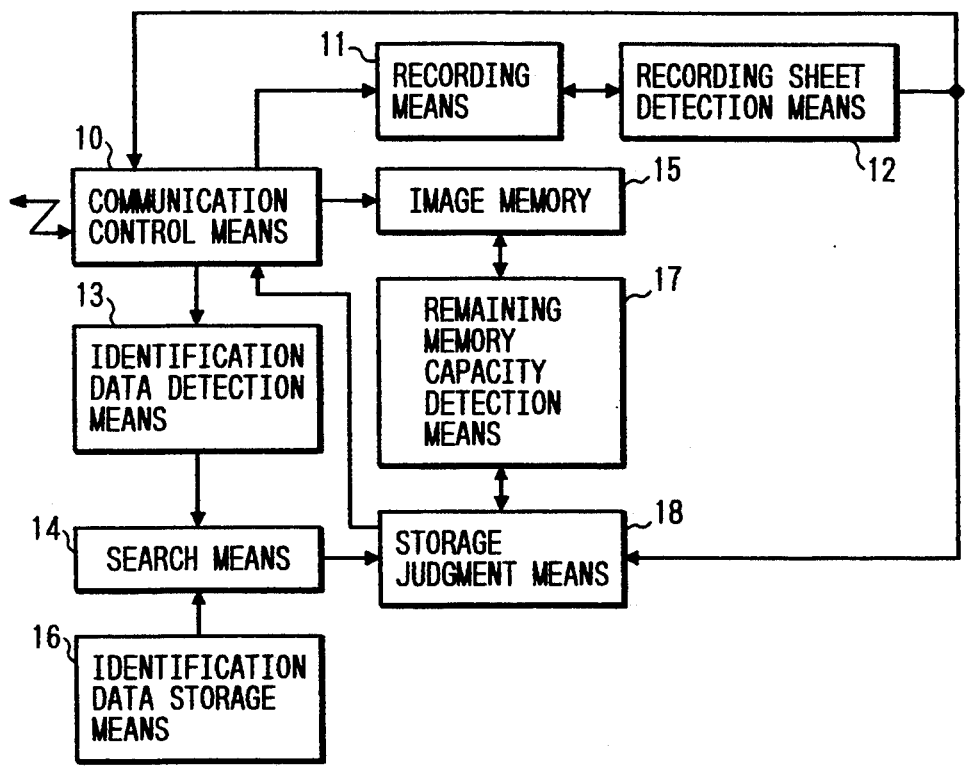
FIG. 1 is a functional block diagram of a first embodiment of the invention.

FIG. 1 is a functional block diagram of a first embodiment of the invention.

In FIG. 1, a communication control means 10 is connected to communication lines to control reception and transmission of image data with other facsimile systems. A recording means 11 records image data inputted to the communication control means 10 on a recording sheet. A recording sheet detection means 12 detects the remaining amount of a recording sheet contained in the recording means 11, and the result of the detection is applied to both the communication control means 10 and a storage judgment means 18. An image memory 15 temporarily stores the image data applied to the communication control means 10.

A remaining memory capacity detection means 17 detects a remaining memory capacity in the image memory 15 and outputs the result of the detection to the storage judgment means 18. An identification data detection means 13 detects identification data transmitted from a counterpart station together with image data thereof. An identification data storage means 16 stores in advance identification data of counterpart stations whose image data are to be permitted to be stored.

A searching means 14 searches the identification data detected by the identification data detection means 13 from among the identification data stored in the identification data storage means 16 and supplies the result of the searching to the storage judgment means 18. The storage judgment means 18, upon judgment that the remaining amount of the recording sheet is insufficient by the recording sheet detection means 12, instructs the communication control means 10 to permit or prohibit the storage of the image data based on the result of the detection by the remaining memory capacity detection means 17 and the result of the searching by the searching means 14.

FIG. 5 is a flowchart illustrative of an operation of the embodiment shown in FIG. 1.

When the communication control means 10 detects reception of image data in Step S10, the remaining amount of a recording sheet contained in the recording means 11 is detected by the recording sheet detection means 12 in Step S11. If the recording sheet is sufficient, the image data is recorded on the recording sheet in Step S12. If, on the other hand, the recording sheet is judged to be insufficient in Step S11, the identification data of the counterpart station is detected by the identification data detection means 13 in Step S13.

The term "identification data" is herein used to mean a reference character or number specifically assigned to each counterpart station. A telephone number is one example of identification data.

The remaining memory capacity in the image memory 15 is detected by the remaining memory capacity detection means 17 in Step S14, and the result of the detection is outputted to the storage judgment means 18. If the remaining memory capacity is greater than a reference value k, then the storage judgment means 18 instructs the communication control means 10 to permit the storage of the image memory. As a result, the image data is stored in the image memory 15 in Step S17.

If the remaining memory capacity is smaller than the reference value k, then the identification data of the counterpart station detected by the identification data detection means 13 is searched from a multiplicity of identification data stored in the identification data storage means 16. The result of the searching is then outputted to the storage judgment means 18.

The result of the searching is referenced in Step S16, and if the searching has been successful, i.e., the detected identification data is stored in the identification data storage means 16, then the storage judgment means 18 instructs the communication control means 10 to permit the storage. As a result, the image data is stored in the image memory 15 in Step S17.

If the searching has been unsuccessful, then the storage judgment means 18 prohibits the storage of the image data. Thus, the processing is brought to an end without storing the image data.

According to the first embodiment, only the image data from a counterpart station whose identification data is stored in the identification data storage means 16 is stored in the image memory, when the remaining image memory capacity becomes small in the case of executing a substitute reception with no recording sheet available. Therefore, if identification data of an important counterpart station or a counterpart station from which image data of emergency is to be transmitted is stored in advance in the identification data storage means 16, then the image data from such specific counterpart station can be stored selectively.

Figure 2:
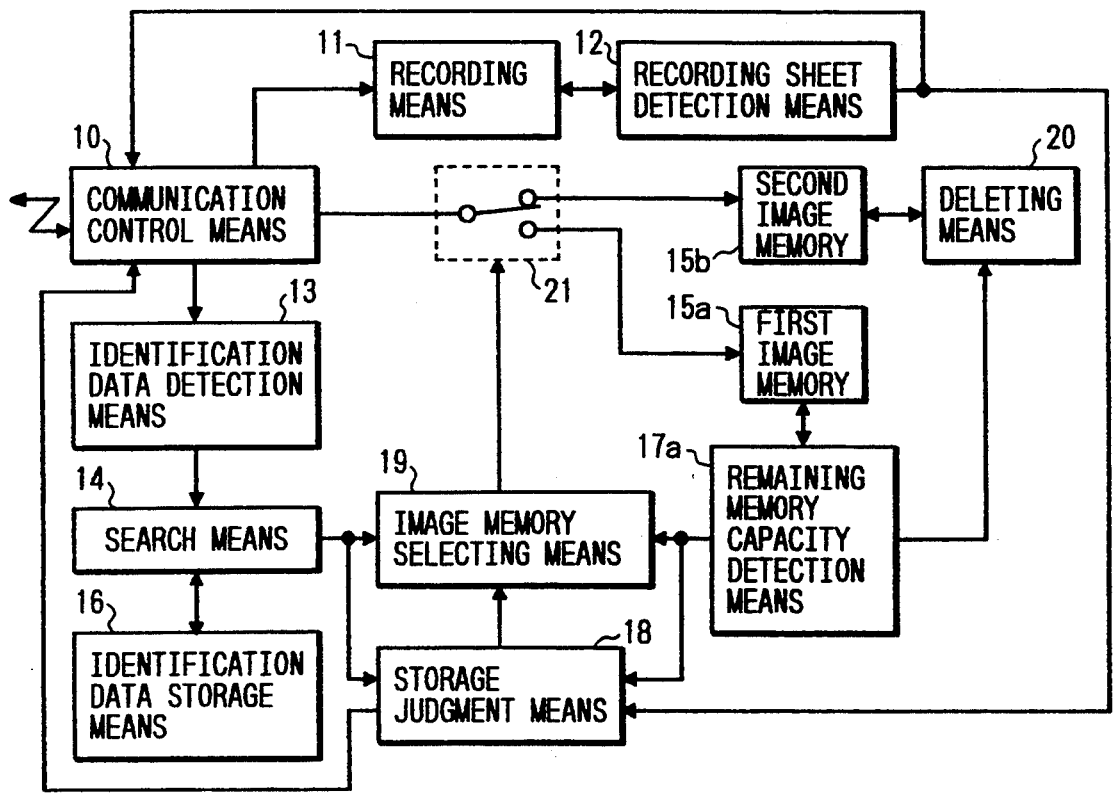
FIG. 2 is a functional block diagram of a second embodiment of the invention.

FIG. 2 is a functional block diagram of a second embodiment of the invention. The same reference numerals and characters as those used above designate the same or like parts and components.

In FIG. 2, a first image memory 15a stores image data transmitted from specific counterpart stations whose identification data are stored in the identification data storage means 16. In a second image memory 15b stores mainly image data transmitted from counterpart stations other than the specific counterpart stations. A remaining memory capacity detection means 17a detects the remaining memory capacity of the first image memory 15a and outputs the result of the detection to both the storage judgment means 18 and an image memory selecting means 19.

A deleting means 20 deletes a content stored in the second image memory based on the result of the detection by the remaining memory capacity detection means 17. The image memory selecting means 19 selects either the first or the second image memory as a destination for storing image data based on the result of the searching by the searching means 14 and the result of the detection by the remaining memory capacity detection means 17.

FIG. 6 is a flowchart illustrative of an operation of the embodiment shown in FIG. 2.

Since the processing steps from Steps S20 to S23 are the same as the processing steps from Steps S10 to S13, the description thereof will be omitted.

The remaining memory capacity in the first image memory 15a is detected by the remaining memory capacity detection means 17a in Step S24. If the remaining memory capacity is greater than a reference value k, the identification data detected by the identification data detection means 13 is searched from among a multiplicity of identification data stored in the identification data storage means 16 in Step S25.

If the searching has been found successful by referencing the result of the detection in Step S26, a switching section 21 is controlled by the image memory selecting means 19 in Step S27 to select the first image memory 15a as a destination for storing the image data.

Since the storage judgment means 18 instructs the communication control means 10 to permit the storage of the image data, the image data is stored in the first image memory 15a in Step S28.

If the searching has been found unsuccessful in Step S26, then the image memory selecting means 19 controls the switching section 21 to select the second image memory 15b as a destination for storing the image data in Step S29.

Since the storage judgment means 18 instructs the communication means 10 to permit the storage of the image data, the image data is stored in the second image memory 15b in Step S30.

On the other hand, if the remaining memory capacity is judged to be smaller than the reference value k in Step S24, it is judged whether or not the second image memory 15b has been cleared in Step S31. If not, the second image memory 15b is cleared by the deleting means 20 in Step S32.

The identification data detected by the identification data detection means 13 is similarly searched in Step S33, and the result of the searching is referenced in Step S34.

If the searching has been found successful, then the image memory selecting means 19 controls the switching section 21 based on the result of the detection by the remaining memory capacity detection means 17a in Step S35. At this point, if a capacity large enough to store the image data is available in the first image memory 15a, the first image memory 15a is selected. Otherwise, the second image memory 15b is selected.

Since the storage judgment means 18 instructs the communication control means 10 to permit the storage in Step S36, the image data is stored either in the first image memory 15a or the second image memory 15b. If, on the other hand, the searching has been unsuccessful, then the processing is terminated without storing the image data.

According to the second embodiment, image data from a counterpart station whose identification data is stored is stored in the first image memory, while image data of a counterpart station whose identification data is not stored is stored in the second image memory. Further, when the first image memory becomes full, the second image memory is cleared so that image data from a counterpart station whose identification data is stored is stored in the second image memory. Therefore, if identification data of counterpart stations from which important image data are transmitted are stored in the identification data storage means 16 in advance, the image data from such specific counterpart stations can be stored preferentially.

FIG. 3 is a functional block diagram of a third embodiment of the invention. The same reference numerals and characters as those used above designate the same or like parts and components.

In FIG. 3, a priority determining means 23 has a data table such as shown in FIG. 9, which data table indicates the relationship between identification data and priority Ma. The priority determining means 23 outputs a priority Ma corresponding to identification data detected by the identification data detection means 13 to a comparing means 22.

A priority output means 24 outputs a reference priority Mb to the comparing means 22. The reference priority is a pre-registered reference value for permitting the storage of image data. The comparing means 22 compares the priority Ma and the reference priority Mb and outputs the result of the comparison to a storage judgment means 25.

The storage judgment means 25 instructs the communication control means 10 to permit or prohibit the storage of image data based on both the result of the comparison and the result of the detection by the remaining memory capacity detection means 17.

FIG. 7 is a flowchart illustrative of an operation of the embodiment shown in FIG. 3.

Since processing steps from Steps S40 to S43 are the same as those from Steps S10 to S13, the description thereof will be omitted.

The remaining memory capacity in the image memory 15 is detected by the remaining memory capacity detection means 17 in Step S44. If the remaining memory capacity is greater than the reference value k, then the image data is stored in the image memory 15 in Step S47.

If, on the other hand, the remaining memory capacity is smaller than the reference value k, then the priority determining means 23 finds a priority Ma corresponding to the detected identification data based on the data table shown in FIG. 9 and outputs the found priority Ma to the comparing means 22 in Step S45.

The comparing means 22 compares the priority Ma and the reference priority Mb in Step S46. If the priority Ma is higher than the reference priority Mb (priority Ma>reference priority Mb), then the image data is stored in the image memory 15 in Step S47. If the priority Ma is lower than the reference priority Mb, then the processing is put to an end without storing the image data.

According to the third embodiment, only the image data from a counterpart station having a priority higher than the reference priority is selectively stored. Therefore, the image memory can be utilized effectively. Image data from a specific counterpart station can be stored selectively.

FIG. 4 is a functional block diagram showing a fourth embodiment of the invention. The same reference numerals and characters as those used above designate the same or like parts and components.

In FIG. 4, a priority judgment means 27 has a data table such as shown in FIG. 10. The data table indicates the relationship between remaining memory capacity and priority threshold Mth. The priority judgment means 27 inputs the result of the detection by the remaining memory capacity detection means 17 and outputs a priority threshold Mth corresponding to the detected remaining memory capacity to a comparing means 28.

The comparing means 28 compares the priority Ma of a counterpart station outputted from the priority determining means 23 with the priority threshold Mth outputted from the priority judgment means 27. The comparing means 28 then outputs the result of the comparison to a storage judgment means 26. The storage judgment means 26 instructs the communication control means 10 to permit or prohibit the storage of image data based on the result of the comparison.

FIG. 8 is a flowchart illustrative of an operation of the embodiment shown in FIG. 4.

Since processing steps from Steps S50 to S53 are the same as those from Steps S10 to S13, the description thereof will be omitted.

The priority determining means 23 outputs a priority Ma corresponding to detected identification data to the comparing means 28 in Step S54.

The remaining memory capacity detection means 17 detects the remaining memory capacity in the image memory 15 in Step S55. The priority determining means 27 judges a priority threshold Mth corresponding to the detected remaining memory capacity based on the data table shown in FIG. 10 and outputs the result of the judgment to the comparing means 28 in Step S56.

The comparing means 28 then compares the priority Ma with the threshold Mth in Step S57. If the priority Ma is higher than the threshold Mth, then the image memory is stored in the image memory 15 in Step S58. If, on the other hand, the priority Ma is lower than the threshold Mth, then the processing is terminated without storing the image data.

According to the fourth embodiment, image data transmitted from a counterpart station having a priority higher than the threshold Mth determined by the remaining memory capacity is stored preferentially. That is, as the remaining memory capacity is on the decrease, image data from a counterpart station having a higher priority is permitted to be stored. Therefore, the image memory can be utilized effectively. Image data from a specific counterpart station can be stored preferentially.

In the above-mentioned embodiments, when the remaining memory capacity in the image memory is decreased during substitute reception, the storage of image data from a counterpart station is prohibited if the identification data thereof is not registered or the priority given thereto is lower than the reference priority or threshold. If the storage of image data is prohibited, the redialing function of the counterpart station is activated, causing the counterpart station to often redial the user system.

To overcome this problem, a technique of not actually storing image data but outputting a signal indicating that the image data is stored in terms of protocol may be employed. This technique prevents useless redialing by the counterpart station.

Moreover, while the function of substitute reception is performed only when the recording sheet is insufficient in the above-mentioned embodiments, the application of the invention is not limited thereto. The invention may also be applied to a case where substitute reception is forcibly intervened independently of the presence of a recording sheet.

As is apparent from the foregoing description, the following advantages can be obtained by the invention.

(1) As the remaining memory capacity becomes scarce during substitute reception, image data from a counterpart station having pre-registered identification data is stored selectively or preferentially. Therefore, the pre-registration of the identification data of an important counterpart station or the like allows image data of such specific counterpart station to be stored selectively or preferentially. Thus, the image memory can be utilized effectively.

(2) Counterpart stations are classified by priority, and only the image data of a counterpart station having a priority higher than a predetermined priority is stored in the image memory selectively. Therefore, the image data of a specific counterpart station having a higher priority can be received selectively. Thus, the image memory can be utilized effectively.

What is claimed is:

1. A facsimile system comprising:

means for detecting identification data of a counterpart station, said identification data being received together with image data from said counterpart station;

means for storing identification data of specific counterpart stations;

means for searching said identification data detected by said identification data detection means from among identification data stored in said identification data storage means;

a first image memory for storing image data transmitted from said specific counterpart stations;

a second image memory for storing mainly image data transmitted from stations other than said specific counterpart stations;

means for detecting a remaining memory capacity in said first image memory;

means for judging whether storage of image data is permitted or prohibited based on a result of the searching by said searching means and a result of the detection by said remaining memory capacity detection means; and means for selecting either said first image memory or said second image memory as a destination for storing said image data based on said result of the searching by said searching means and said result of the detection by said remaining memory capacity detection means.

2. A facsimile system as claimed in claim 1, further comprising:

means for recording on a recording medium said image data sent from said counterpart station; and means for detecting the remaining amount of said recording medium in said recording means.

* * * * *